Feb. 25, 1969     H. BORNEFELD     3,429,610
SUN VISOR, PARTICULARLY FOR AUTOMOTIVE VEHICLES
Filed March 2, 1967
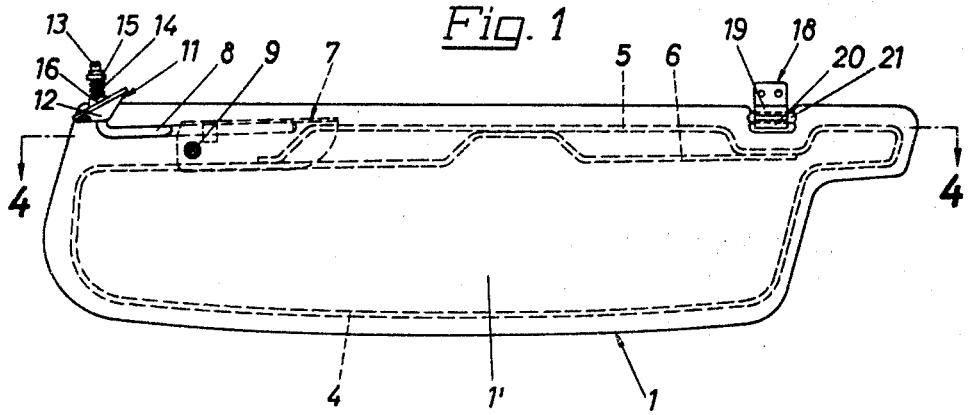
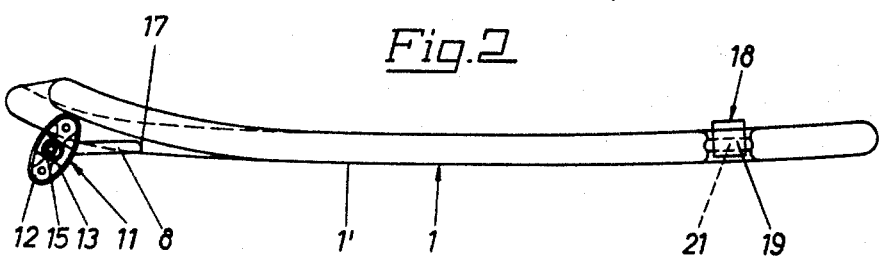
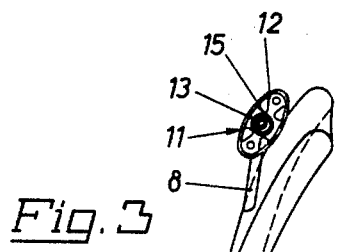
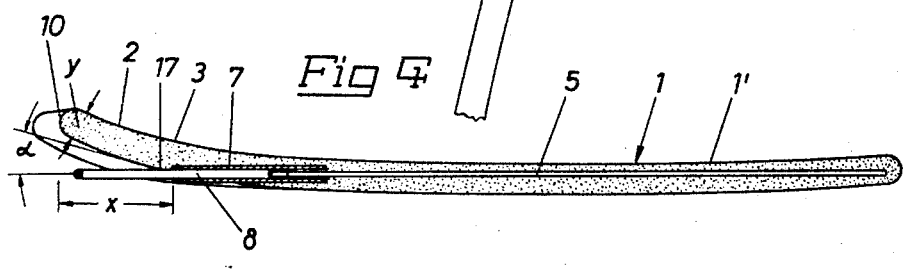
INVENTOR.
Heinz Bornefeld
BY
Ernest G. Montague
Attorney United States Patent Office 3,429,610
Patented Feb. 25, 1969

3,429,610
SUN VISOR, PARTICULARLY FOR
AUTOMOTIVE VEHICLES
Heinz Bornefeld, Wuppertal-Elberfeld, Germany, assignor to Gebr. Happich G.m.b.H., Wuppertal-Elberfeld, Germany, a corporation of Germany
Filed Mar. 2, 1967, Ser. No. 620,012
Claims priority, application Germany, Mar. 10, 1966, H 58,764
U.S. Cl. 296—97                     4 Claims
Int. Cl. B60j 3/02

ABSTRACT OF THE DISCLOSURE

A sun visor, particularly for automotive vehicles formed as a pillow body comprises a pivot bearing protected by upholstering and a holding rod for the pivot bearing projects at an acute angle from the outer face of the sun visor, when the latter is turned into upright position. This outer face covers up protectingly the holding rod.

---

The present invention relates to a sun visor, in particular, for automotive vehicles.

Sun visors for automotive vehicles are already known, which for the purpose of protection against accidents are formed as pillow bodies. (German Patent No. 930,-729). Also it is known to arrange pivot bearings of such visors protected by upholstery (German Patent No. 938,-894). In this connection for instance a special embodiment is known, in which the bearings of pivot pins and of a holding rod for pivot bearings, respectively, are provided in recesses of the sun visor. In all these known embodiments the holding rod for the pivot bearings and the holding rods of the pivot bearings, respectively, project from the edge formation of the visor or it is disposed basically in the longitudinal median plane of the visor, respectively. This has the consequence that at the most the half thickness of the pillow can be effective as protecting against accidents.

It is one object of the present invention to provide a sun visor for automotive vehicles in which in the position of the visor, generally set in accordance with the experiences in connection with accidents, the holding rod for the pivot bearings and a corresponding securing bearing or the like is covered up by the entire thickness of the pillow of the visor in a manner protecting against accidents. In this connection simultaneously a simple and practically holding structure should be realized. The invention starts here with the found discovery, that the greatest number of accidents occur if the visor is in an upturned position, thus in the normal position. Accidents which occur, while the visor is in a parallel position to the wind-shield, are more seldom in accordance with experiences, presumably due to the fact, that during driving while the sun light impinges from the front, greater care is exercized aside from the fact, that the visor is much more often in the upwardly turned normal position, than in the lower position in which the visor is turned down in front of the wind-shield.

It is another object of the present invention to provide a sun visor for automotive vehicles, wherein the holding rod for pivot bearings emerges in an acute angle from the face of the visor, which overlaps in a covering manner the holding rod for the pivot bearings including the securing bearing or the like disposed at its end.

By arranging this embodiment a sun visor is brought about in a simple manufacture, in which the entire upholstering visor thickness is disposed in a manner protecting against accidents in front of the holding rod for the pivot bearings and in front of the securing bearing or the like coordinated thereto and particularly in the upwardly turned position of the visor, as long as the exit of holding rods for the rotary bearings is arranged on the back face of the visor. In contrast to the known embodiments in which the holding rod for the pivot bearings emerges from the edge of the visor and not out of the face of the visor, accordingly by the appreciably enlarged thickness of the pillow an appreciably enlarged protection against accidents is obtained.

It is still another object of the present invention to provide a sun visor for automotive vehicles, wherein in order to obtain the acute angle between the visor face and the holding rod for the pivot bearings, the visor face is bent within a range laterally from the emerging point of the holding rods.

With these and other objects in view which will become apparent in the following detailed description, the present invention will be clearly understood in connection with the accompanying drawings, in which:

FIGURE 1 is an elevation locking towards the rear face of a visor turned down into its lower position;

FIG. 2 is a top plan view thereof;

FIG. 3 is a top plan view of the visor in its turned down position and further turned to a sideways position;

FIG. 4 is a section along the lines 4—4 of FIG. 1;

Figure 5:
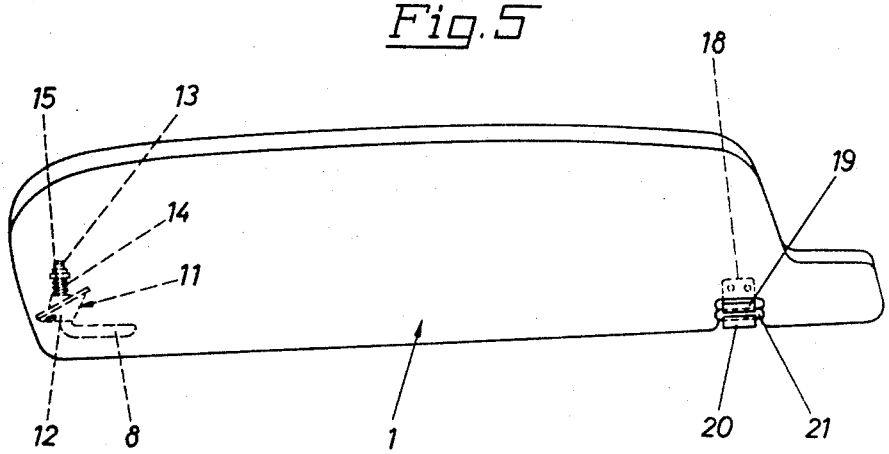
FIG. 5 is an elevation towards the front face of the visor in upwardly turned position of the latter.

Referring now to the drawings, the visor 1 is formed as a pillow body, preferably such, that an envelope-like pocket 2 formed by means of a foil of synthetic material with pillow material, for instance, foam material 3, is tightly filled. Inside of the visor is disposed an elastic wire frame 4 adjusted substantially to the outer configuration, which wire frame 4 is effective, on the one hand, form retaining and, on the other hand, brings about the result that in case of accidental jolts in the plane of the visor an elastic return formation of the visor into its original form takes place. The elastic frame 4 forms on the upper longitudinal edge of the visor a stay doubled by the sections 5 and 6. A pivot bearing 7 sits on the stay, which pivot bearing 7 carries the holding rod 8 for the pivot bearing. An adjustment screw 9 permits the setting of different friction values between the rotary bearing 7 and the holding rod 8.

The holding rod 8 for the pivot bearings emerges from the rear face 1' of the visor at an acute angle α (FIG. 4) and in particular at a distance x from the edge formation 10 of the visor. The distance x is greater than the length of the freely projecting end of the holding rod 8 for the pivot bearings including the securing bearing 11 disposed thereon. The visor 1 projects thereby with its section x the free length of the emerged holding rod 8.

The securing bearing 11 comprises a securing anchor plate 12, which sits on an angularly bent section 13 of the holding rod 8. A pressure spring 14, disposed on this angularly bent section 13, supports itself, on the one hand, against a disc 15 provided on the section 13 and, on the other hand, against an annular shoulder 16 of the anchor plate 12. The total bent section 13 including the spring 14 and shoulder 16 of the anchor plate 12 are received, upon securing of the visor in the automotive vehicle, in the securing face. The particular formation of the securing bearing 11, permits a swinging of the visor from the downwardly turned position in accordance with FIG. 1 also to the side into the position disclosed in FIG. 3.

The acute angle α is in the embodiment shown by example realized such, that the visor face is disposed curved laterally from the emerging position 17 (FIGS. 2 and 4) of the holding rods.

Figure 6:
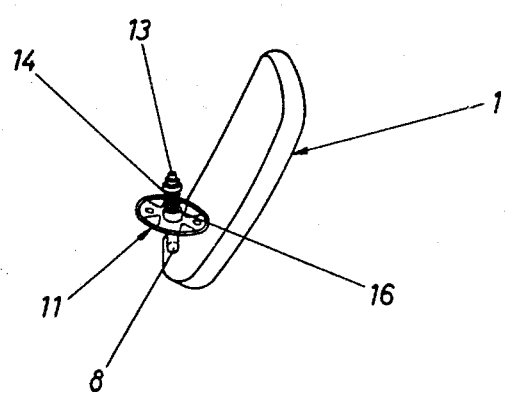
FIG. 6 is an end view of the visor likewise in upwardly turned position.

If the visor is in upwardly turned position (FIGS. 5 and 6), the total visor thickness y is disposed as accident protecting pillow body in front of the freely extending section of the holding rod 8 and in front of the securing bearing 11. The same applies also for the laterally turned position, as shown in FIG. 3. Merely in the parallel downwardly turned position in front of the windshield (FIG. 1) the holding rod 8 is partly and the anchor plate 12 of the pivot bearing 11 is completely free. In view of the rare occurrene of accidents in this visor position the drawback brought about thereby can be taken in stride. Under the circumstances also the possibility exists to form the holding rod 8 or the freely disposed part section elastically bending through.

At the end disposed opposite the holding rod 8 of the pivot bearing the visor has another small auxiliary bearing 18 disposed in a recess of the visor, which auxiliary bearing 18 can be formed elastically due to the small carrying force required therefor. It has two clamps 19 and 20 between which a rotary pin 21 is disposed. During turning of the visor into the position shown in FIG. 3, the rotary pin 21 is removed between the clamps 19 and 20.

While I have disclosed one embodiment of the present invention, it is to be understood that this embodiment is given by example only and not in a limiting sense, the scope of the present invention being determined by the objects and the claims.

I claim:

1. A sun visor particularly for automotive vehicles, comprising
    an upholstered pillow body having a front and a rear face, as well as edges,
    a pivot bearing disposed substantially within the horizontal limits of said pillow body and extending adjacent said rear face at a position spaced from said edges of the pillow body,
    a holding rod pivotally mounted within said pivot bearing and projecting laterally therefrom and relative said pillow body from said rear face, and defining an acute angle with said rear face,
    said holding rod extending a distance short of the edge of said pillow body, thereby being completely covered relative the front face of said pillow body, and
    a securing bearing disposed on the free end of said holding rod and completely covered relative the front face by said pillow body when the latter is pivoted to an upward position with the front face forward.

2. The sun visor, as set forth in claim 1, wherein
    said rear face of said sun visor is curved inwardly toward said front face at the point of emergence of and laterally from said holding rod, in the upright position of said sun visor defining said acute angle.

3. The sun visor, as set forth in claim 1, wherein
    said holding rod is angularly bent upwardly at the free end thereof and covered by said pillow body when the latter is in the upward position, and
    said securing bearing pivotally mounted on said upwardly bent free end of said holding rod and adapted to permit a swinging of said pillow body from the downward position into a sideways position.

4. The sun visor, as set forth in claim 3, further comprising
    a disc mounted at the remote portion of said free end of said holding rod,
    said securing bearing includes a securing anchor plate including an annular shoulder thereon, and
    a compression spring coiled on said free end between said annular shoulder and said disc.

References Cited

UNITED STATES PATENTS

| | | | |
|---|---|---|---|
| 2,561,711 | 7/1951 | Ruf | 296—97 |
| 2,825,601 | 3/1958 | Doty | 296—97 |
| 3,035,864 | 5/1962 | Davidson | 296—97 |
| 3,188,112 | 6/1965 | Oelkrug | 296—97 |

BENJAMIN HERSH, *Primary Examiner.*

L. D. MORRIS, JR., *Assistant Examiner.*